(12) United States Patent  (10) Patent No.: US 6,950,038 B2
Hsu  (45) Date of Patent: Sep. 27, 2005

(54) COLLAPSIBLE KEYBOARD (75) Inventor: Chien-Shih Hsu, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 453 days.

(21) Appl. No.: 10/322,235

(22) Filed: Dec. 17, 2002

(65) Prior Publication Data
US 2003/0122690 A1 Jul. 3, 2003

(30) Foreign Application Priority Data
Dec. 28, 2001 (TW) .................................. 90223611 U (51) Int. Cl.7 ............................................ H03K 17/94
(52) U.S. Cl. ...................... 341/22; 341/20; 400/489; 400/492; 400/473; 345/168; 361/680
(58) Field of Search ................ 341/20, 22; 361/680; 345/168; 400/473, 495, 492, 489

(56) References Cited

U.S. PATENT DOCUMENTS 3,940,758 A * 2/1976 Margolin .................... 345/169
5,995,025 A * 11/1999 Sternglass et al. ............. 341/22
6,111,527 A * 8/2000 Susel ........................... 341/22
6,266,234 B1 * 7/2001 Leman ........................ 361/680
6,331,850 B1 * 12/2001 Olodort et al. .............. 345/168
6,707,664 B2 * 3/2004 Murphy ...................... 361/680
6,739,774 B1 * 5/2004 Lahr ........................... 400/495

* cited by examiner

Primary Examiner—Albert K. Wong
(74) Attorney, Agent, or Firm—Ladas & Parry LLP (57) ABSTRACT A collapsible keyboard. The collapsible keyboard includes a keyboard chassis, a right track frame, a right key set and a main key set. The right track frame is disposed on the keyboard chassis and slides rightward and leftward. The right track frame has a first sloped sliding groove. The left portion of the first sloped sliding groove is higher than the right portion of the first sloped sliding groove. The right key set is connected to the right track frame. The right track frame is moved rightward to a right expansion position when the right key set moves rightward. The right track frame is moved leftward to a right contraction position when the right key set moves leftward. The main key set has a right protruding element. The right protruding element is formed on the right side of the main key set and slides in the first sloped sliding groove.

29 Claims, 11 Drawing Sheets

FIG. 10

COLLAPSIBLE KEYBOARD

BACKGROUND OF THE INVENTION

1. Field of the Invention

The present invention relates to a collapsible keyboard, and in particular to a collapsible keyboard with reduced length.

2. Description of the Related Art

Generally speaking, a keyboard is an important input device for a computer. Many characters and symbols are input to the computer by the keyboard. Other input devices, such as a mouse and an optical pen, have slow input speed and cannot take the place of the keyboard.

A conventional keyboard usually includes a base and a plurality of keys disposed thereon. A user strikes the keys to output corresponding electronic signals to the computer.

Although the conventional keyboard is a convenient input device, its length and large footprint make it inconvenient to transport. Thus, a foldable keyboard (WO00/60438) is disclosed to overcome the above problems.

The invention provides a collapsible keyboard. The collapsible keyboard can be collapsed into an upper layer and a lower layer to reduce the length thereof.

SUMMARY OF THE INVENTION

An object of the invention is to provide a collapsible keyboard. The collapsible keyboard comprises a keyboard chassis, a right track frame, a right key set and a main key set. The right track frame is disposed on the keyboard chassis and slides rightward and leftward. The right track frame has a first sloped sliding groove. The left portion of the first sloped sliding groove is higher than the right portion of the first sloped sliding groove. The right key set is connected to the right track frame. The right track frame is moved rightward to a right expansion position when the right key set moves rightward. The right track frame is moved leftward to a right contraction position when the right key set moves leftward. The main key set has a right protruding element. The right protruding element is formed on the right side of the main key set and slides in the first sloped sliding groove.

When the right track frame is moved to the right expansion position, the right protruding element of the main key set slides to the left portion of the first sloped sliding groove so that the right side of the main key set rises to the same height as the right key set.

When the right track frame is moved to the right contraction position, the right protruding element of the main key set slides to the right portion of the first sloped sliding groove so that the right side of the main key set lowers below the right key set.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Referring to FIGS. 1A, 1B, 1C and 1D, the collapsible keyboard of the invention comprises a right key set 1, a left key set 2, a main key set 3, a right track frame 4, a left track frame 5, a right toggle means 17 and a left toggle means 18. The right toggle means 17 and left toggle means 18 can keep a movable element in two different positions alternately. Namely, when the odd toggle is actuated, the movable element stays in a first position. When the even toggle is actuated, the movable element stays in a second position.

Figure 1A:
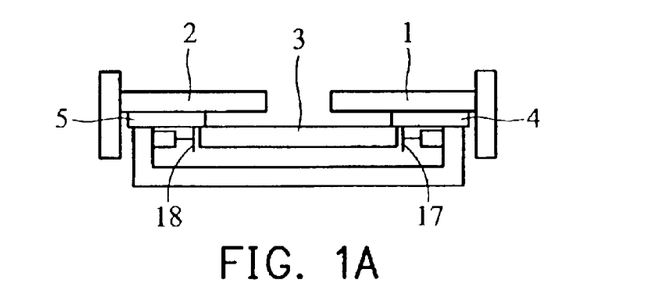
FIGS. 1A, 1B, 1C and 1D show continuous expansion of the flexible keyboard of the invention.
Figure 1B:
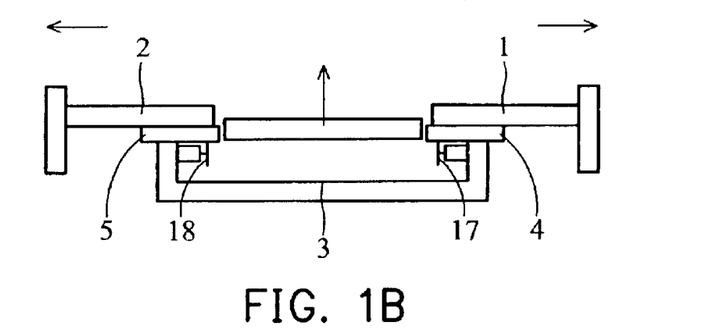
Figure 1C:
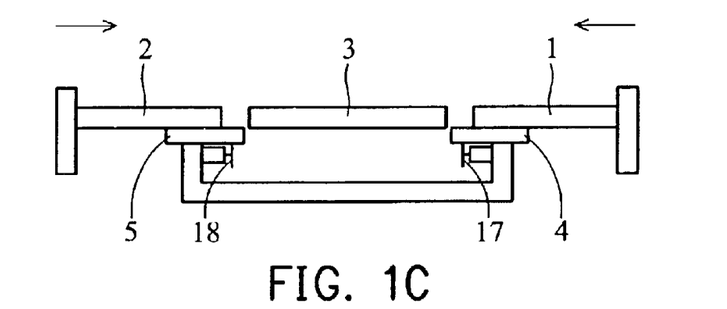
Figure 1D:
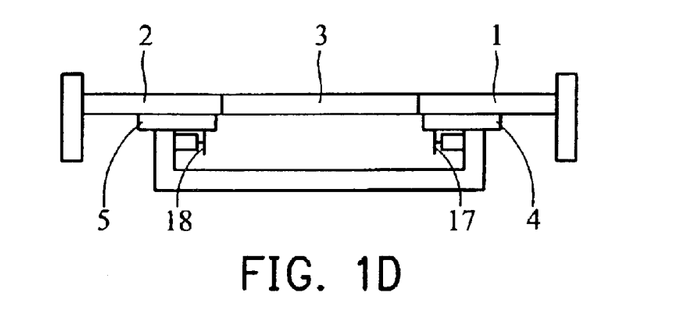

As shown in FIG. 1A, the collapsible keyboard is in a contraction mode. The collapsible keyboard is contracted into an upper layer and a lower layer. The upper layer includes the right key set 1 and the left key set 2. The lower layer includes the main key set 3. As shown in FIG. 1B, when the left key set 2 and the right key set 1 are moved leftward and rightward, respectively, the right track frame 4 and the left track frame 5 are also moved leftward and rightward by the movement of the left key set 2 and the right key set 1, respectively. Then, the main key set 3 rises to the same height as the left key set 2 and the right key set 1. The detailed structure is described later. As shown in FIG. 1C, after the left key set 2 and the right key set 1 are moved to a maximum displacement position, respectively, the left key set 2 and the right key set 1 are further moved toward each other. At this time, the right track frame 4 and the left track frame 5 are not moved toward each other again due to restriction of the right toggle means 17 and the left toggle means 18. Thus, the main key set 3 is not moved downward. As shown in FIG. 1D, when the left key set 2 and the right key set 1 are moved to an expansion position, the main key set 3 combines the left key set 2 and the right key set 1 into a planar keyboard.

Figure 1E:
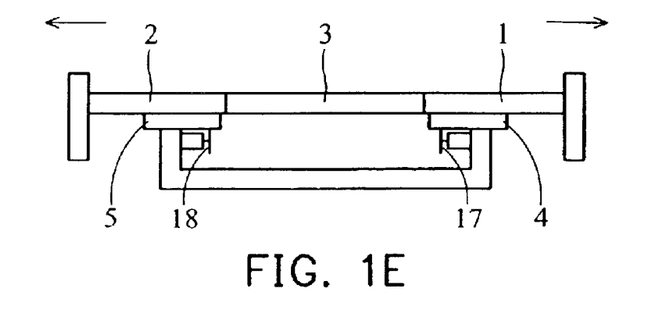
FIGS. 1E, 1F, 1G and 1H show continuous contraction of the collapsible keyboard of the invention.
Figure 1F:
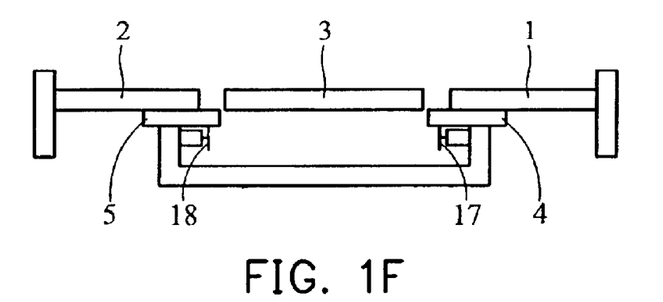
Figure 1G:
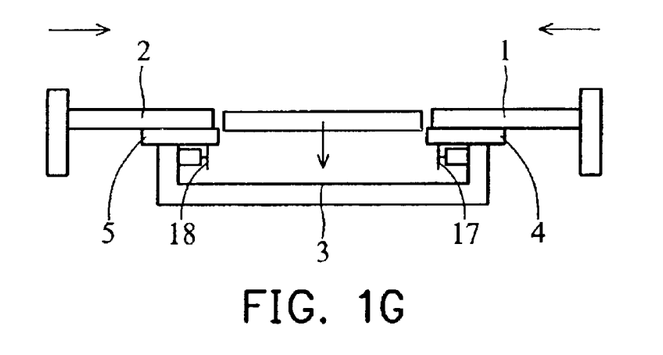
Figure 1H:
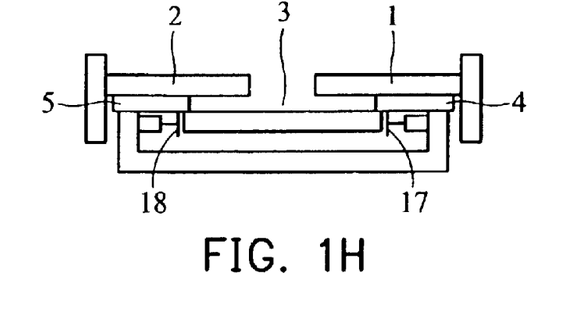

As shown in FIG. 1E, the left key set 2 and the right key set 1 are moved leftward and rightward, respectively. As shown in FIG. 1F, the left key set 2 and the right key set 1 are moved to the maximum displacement position, respectively. As shown in FIG. 1G, the left key set 2 and the right key set 1 are moved toward each other. At this time, the right track frame 4 and the left track frame 5 are not restricted by the right toggle means 17 and the left toggle means 18. Thus, the right track frame 4 and the left track frame 5 are moved toward each other and the main key set 3 is moved downward. As shown in FIG. 1H, the collapsible keyboard is in the contraction mode.

Figure 2A:
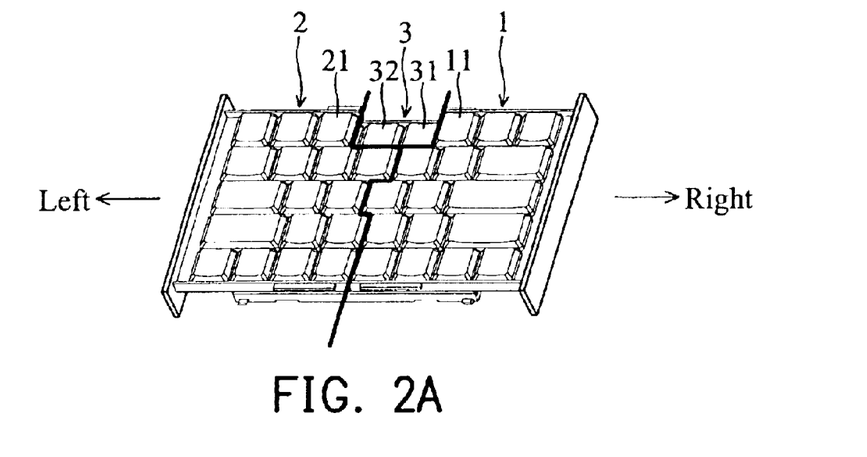
FIGS. 2A, 2B and 2C are views showing continuous expansion of the collapsible keyboard of the invention.
Figure 2B:
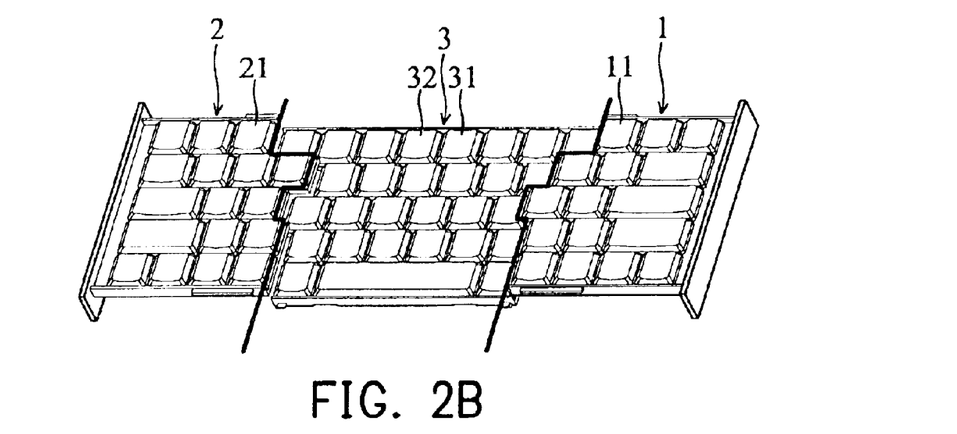
Figure 2C:
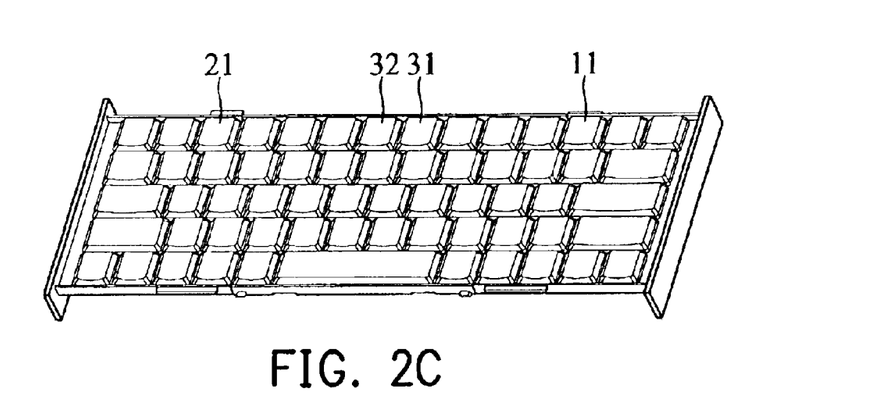

Referring to FIG. 2A, no keys exist in the first row of the left key set 2 and the right key set 1 of the upper layer so that keys 31 and 32 of the main key set 3 of the lower layer are visible. Key 11 is the leftmost key of the first row of the right key set 1 while key 21 is the rightmost key of the first row of the left key set 2. A predetermined distance is formed between the key 11 and the key 21. Thus, an accommodation space is formed between the key 11 and the key 21. When the collapsible keyboard is in contraction mode, the accommodation space accommodates a connector (not shown). The connector is pivotally connected to the front edge of the collapsible keyboard, and alternatively rotated between the vertical position and the horizontal position (not shown). When the connector is in the vertical position, the collapsible keyboard may be connected to a personal computer or a PDA by the connector. When the connector is in the horizontal position, it is accommodated within the accommodation space.

Figure 3:
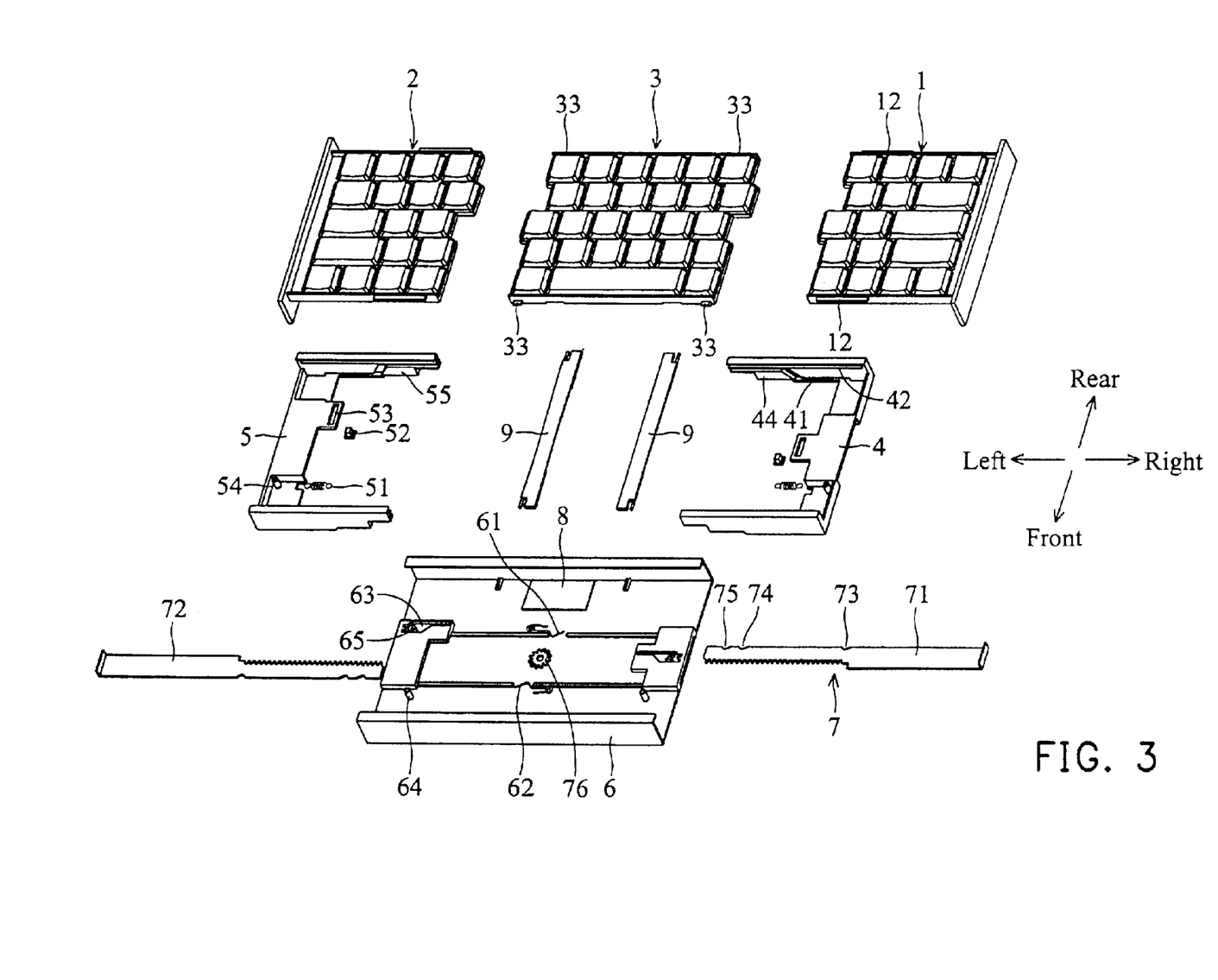
FIG. 3 is a perspective exploded view of the present collapsible keyboard.

Referring to FIG. 3, two pairs of protruding elements 33 are disposed on the front and rear edges of the main key set 3, respectively. Two protrusions 12 are disposed on the front and rear edges of the right key set 1, respectively. The right track frame 4 has a main body. Two cantilevers extend from the main body such that the right track frame 4 is substantially C-shaped. The cantilever has a horizontal sliding groove 42 for accommodating the protrusion 12 of the right key set 1 and a sloped sliding groove 41 for accommodating the protruding element 33 of the main key set 3. In the sloped sliding groove 41, the left side is higher than the right side. Specifically, the left key set 2 and the left track frame 5 are symmetrical to the right key set 1 and the right track frame 4, respectively. The explanation thereof is omitted for simplification of the description.

Figure 4A:
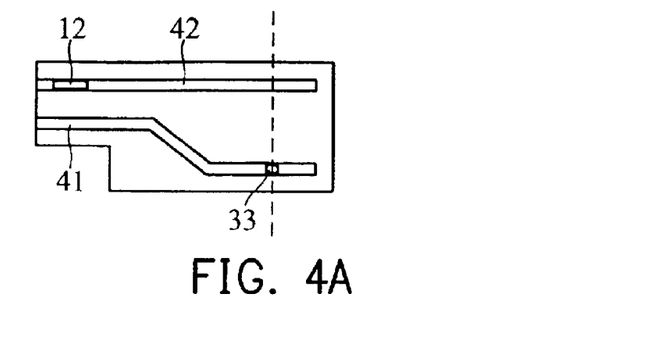
FIGS. 4A, 4B, 4C and 4D show rising of the main key set of the present collapsible keyboard in expansion mode.
Figure 4B:
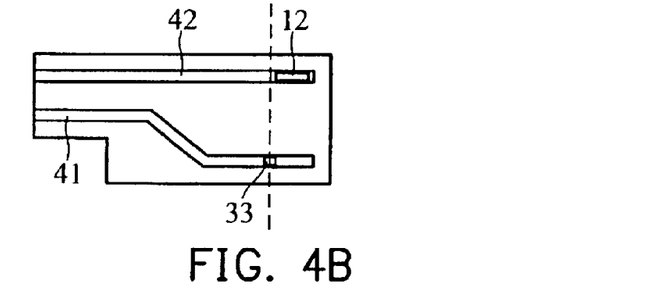
Figure 4C:
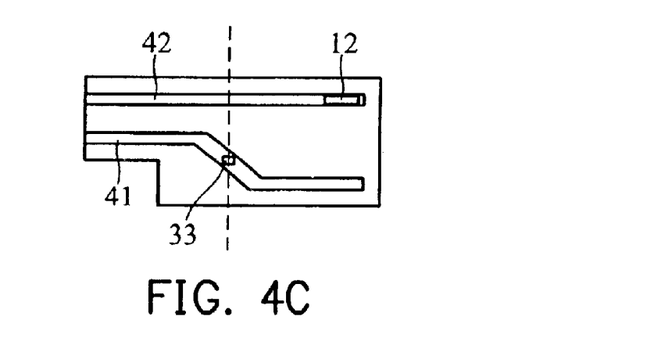
Figure 4D:
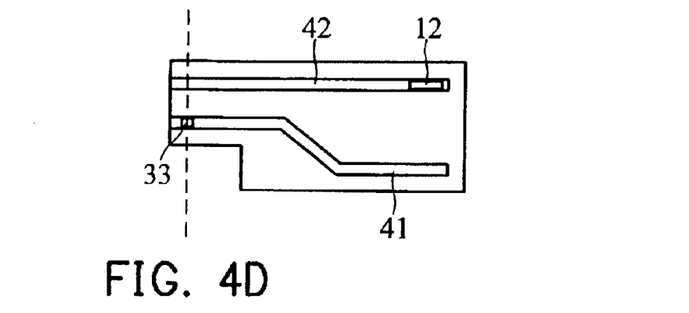

As shown in FIG. 4A and FIG. 4B, the right key set 1 is moved rightward such that the protrusion 12 slides to the rightmost end of the horizontal sliding groove 42. Then, the right key set 1 is still moved rightward such that the protrusion 12 in combination with the right track frame 4 is moved rightward. The protruding element 33 rises by guiding of the sloped sliding groove 41, as shown in FIG. 4C and FIG. 4D. Since the protruding element 33 is formed on the main key set 3, the main key set 3 also rises. Since the operation of the left key set 2 and the left track frame 5 is the same as that of the right key set 1 and the right track frame 4, the explanation thereof is omitted for simplification of the description.

Figure 5:
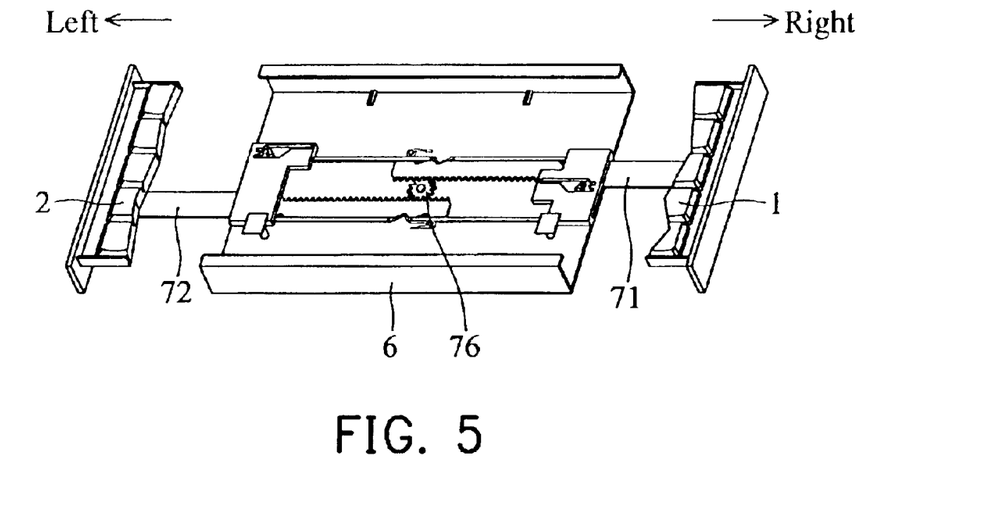
FIG. 5 shows the synchronous mechanism of the present collapsible keyboard.

Referring to FIG. 5, the synchronous mechanism 7 includes two racks 71, 72 and a gear 76. The gear 76 is pivoted to the keyboard chassis 6. The right end of the rack 71 is fixed to the bottom of the right key set 1 by bolts (not shown). The left end of the rack 72 is fixed to the bottom of the left key set 2 by bolts (not shown). When the left key set 2 or the right key set 1 is moved or pulled, the other key set is also moved by the synchronous mechanism 7.

As shown in FIG. 3, two resilient engaging elements 61, 62 are disposed on the keyboard chassis 6 to interact with the racks 71, 72, respectively. For example, the rack 71 has a contraction positioning recess 73, an expansion positioning recess 74 and a maximum displacement positioning recess 75. When the collapsible keyboard is in the contraction mode, as shown in FIG. 1A, the resilient engaging element 61 is positioned in the contraction positioning recess 73. When the right key set 1 is moved rightward to the maximum displacement position, as shown in FIG. 1C, the rack 71 is also moved such that the resilient engaging element 61 is positioned in the maximum displacement positioning recess 75. Then, when the right key set 1 is moved reversely to the expansion position, as shown in FIG. 1D, the rack 71 is also moved such that the resilient engaging element 61 is positioned in the expansion positioning recess 74, as shown in FIG. 5. Since the structures of the rack 72 and the resilient engaging element 62 are symmetrical to those of the rack 71 and the resilient engaging element 61, the explanation thereof is omitted for simplification of the description.

When the left key set 2 and right key set 1 are moved or pulled for the first time, the collapsible keyboard is converted to expansion mode from contraction mode. When the left key set 2 and right key set 1 are moved or pulled for the second time, the collapsible keyboard is converted to contraction mode from expansion mode. Similarly, when the left key set 2 and right key set 1 are moved or pulled for the third time, the collapsible keyboard is converted to contraction mode from expansion mode. The contraction and expansion modes of the collapsible keyboard of the invention can be converted alternately.

As shown in FIG. 3, since the collapsible keyboard has a symmetrical structure, the following description only explains the left portion of the flexible keyboard. A spring 51 is connected between the protruding column 54 of the left track frame 5 and the protruding column 64 of the keyboard chassis 6. When the left track frame 5 is moved leftward by the left key set 2, the left track frame 5 is subjected to the return force of the spring 51.

Figure 6:
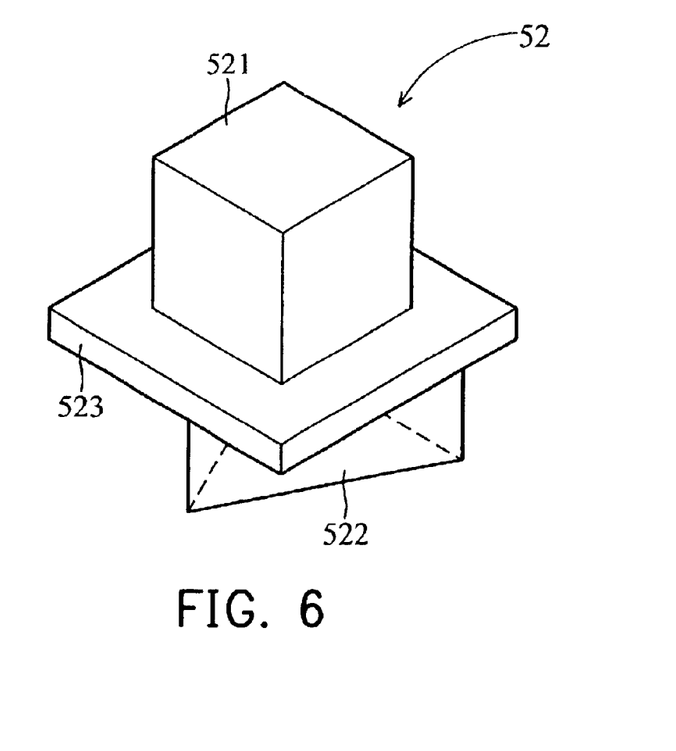
FIG. 6 is a perspective view showing the sliding element of the present collapsible keyboard.

Referring to FIG. 6, the toggle means includes a sliding element 52. The sliding element 52 has a rectangular top portion 521, a triangular column 522 and a flange 523 formed between the rectangular top portion 521 and the triangular column 522. The flange 523 is placed between the left track frame 5 and the keyboard chassis 6. A through groove 53 is formed on the left track frame 5. The rectangular top portion 521 slides in the through groove 53. A recess 63 is formed on the keyboard chassis 6. The triangular column 522 slides in the recess 63.

Figure 7A:
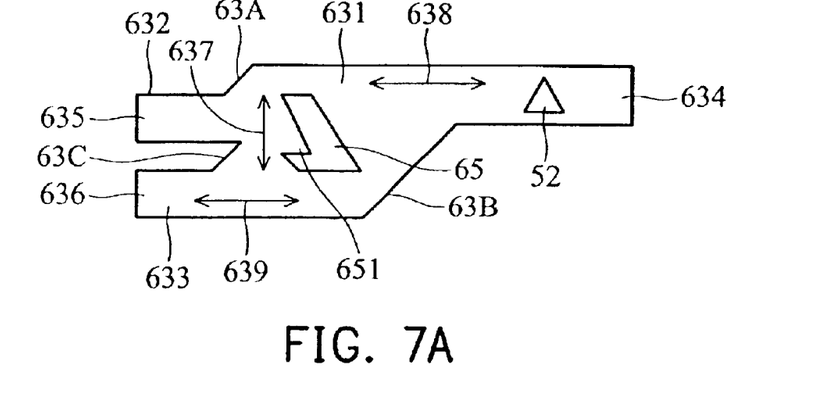
FIGS. 7A, 7B, 7C, 7D and 7E show operation of the toggle means of the present collapsible keyboard in changing the expansion and contraction modes.

Referring to FIG. 7A, the recess 63 is composed of a first portion 631, a second portion 632 and a third portion 633. The first, second and third portions 631, 632, 633 are connected to one another. In addition, a block 65 is disposed in the recess 63. The block 65 has a concave portion 651.

Figure 7B:
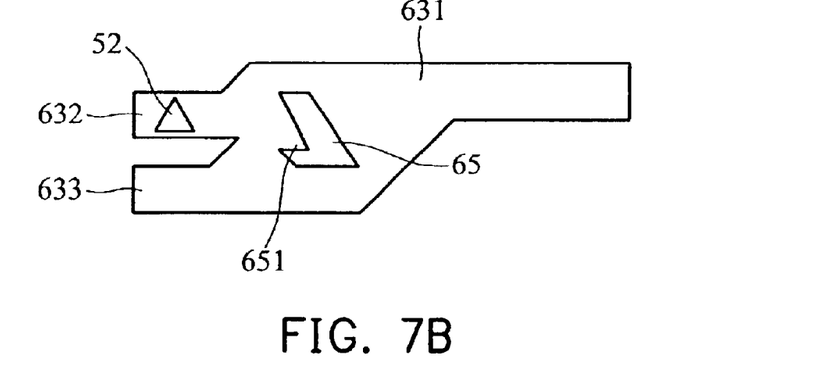
Figure 7C:
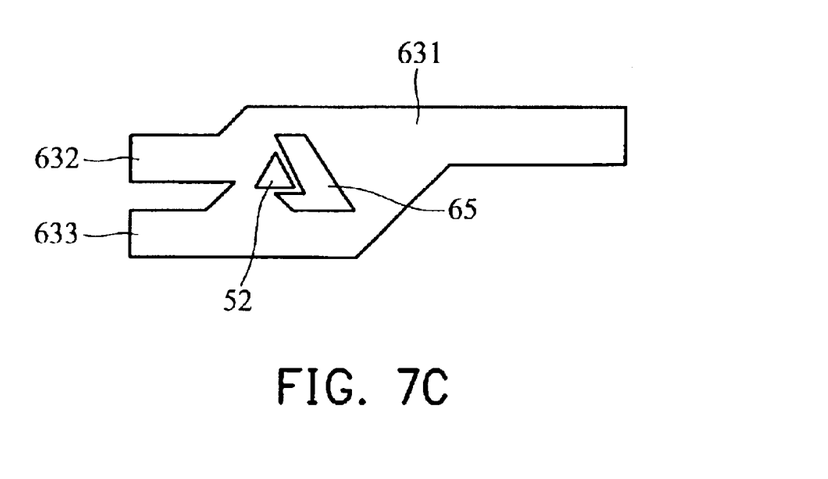
Figure 7D:
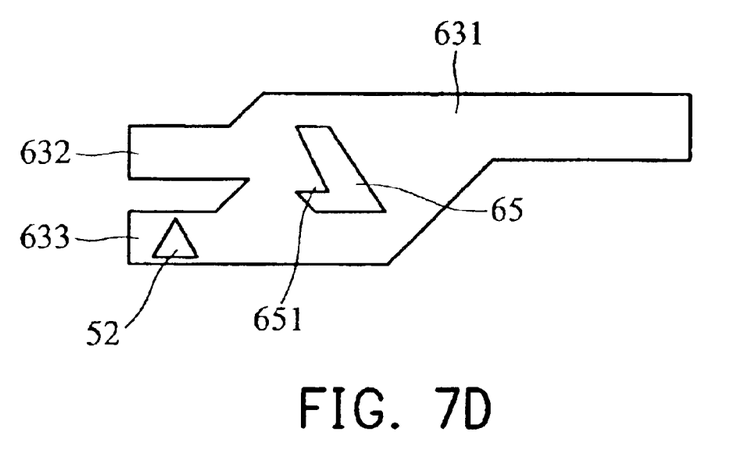
Figure 7E:
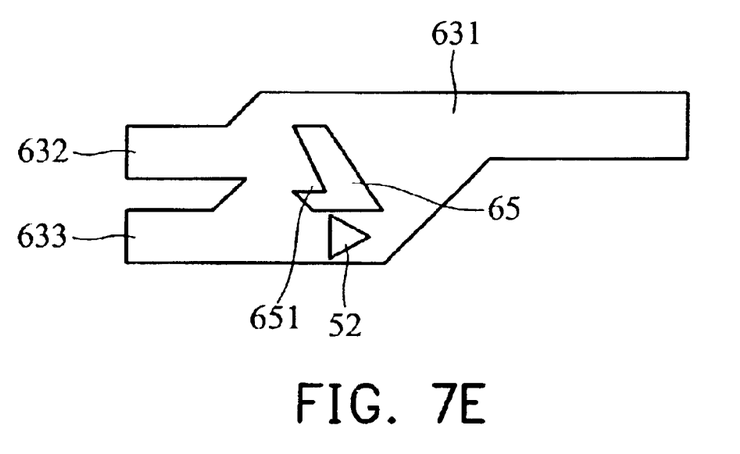

When the left key set 2 is moved or pulled for the first time, the sliding element 52 is moved leftward. The sliding element 52 slides to the second portion 632 from the first portion 631, as shown in FIG. 7B. The sliding element 52 slides to the concave portion 651 of the block 65 by the return force of the spring 51, as shown in FIG. 7C. Because an offset exists between the first portion 631 and the second portion 632, the sliding element 52 cannot slide back to the first portion 631. When the left key set 2 is moved or pulled for the second time, the sliding element 52 slides to the third portion 633 from the concave portion 651, as shown in FIG. 7D. The sliding element 52 slides back to the first portion 631 via the underside of the block 65 by the return force of the spring 51, as shown in FIG. 7E and FIG. 7A. Because an offset exists between the third portion 633 and the concave portion 651, the sliding element 52 cannot slide back to the concave portion 651. When the left key set 2 is moved or pulled for the third time, the operation is the same as that for the first time. As described above, whenever the keyboard is moved or pulled, the movement of the left key set 2 and the right key set 1 is restricted by the right toggle means 17 and the left toggle means 18. The contraction and expansion modes are changed alternately.

The following is a detailed explanation of the right toggle means 17 and the left toggle means 18. The recess 63 is formed on the keyboard chassis 6 and has a right end 634, a first left end 635 and a second left end 636. A front-rear extended channel 637 is connected between the first left end 635 and the second left end 636. A first left-right extended channel 638 is connected between the right end 634 and the first left end 635. A second left-right extended channel 639 is connected between the right end 634 and the second left end 636. A first sloped surface 63A is formed on the left side of the first left-right extended channel 638 and guided toward the first left end 635. A second sloped surface 63B is formed on the right side of the second left-right extended channel 639 and guided toward the right end 634. A third sloped surface 63C is formed on the left side of the front-rear extended channel 637 and guided toward the second left end 636.

When the left key set 2 in the left contraction position is moved leftward, the left track frame 5 is also moved leftward. The triangular column 522 slides to the first left end 635 guided by the first sloped surface 63A. When the left key set 2 is further moved reversely, the triangular column 522 slides to the block 65. Thus, the left track frame 5 cannot be moved rightward and only the left key set 2 is moved continuously to position in the left expansion position.

When the left key set 2 in the left expansion position is moved leftward, the left track frame 5 is also moved leftward. The triangular column 522 slides to the second left end 636 guided by the third sloped surface 63C. When the left key set 2 is further moved reversely, the left track frame 5 is also moved reversely. The triangular column 522 slides to the right end 634 guided by the second sloped surface 63B. At this time, the left key set 2 is positioned in the left contraction position.

Figure 8:
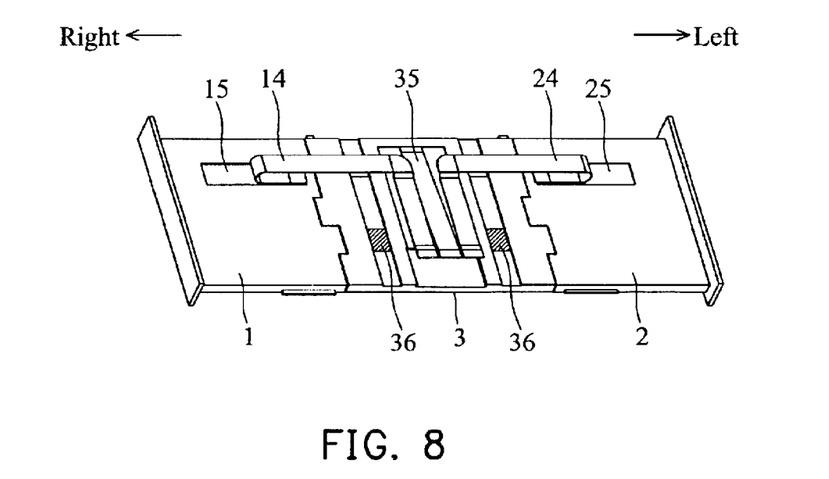
FIG. 8 shows the bottom of the keyboard chassis of the present collapsible keyboard.

Referring to FIG. 8, two magnets 36 are disposed on the bottom of the main key set 3. One end of the flexible circuit board 14 is connected to the right key set 1 while the other end extends to the bottom of the main key set 3. Similarly, one end of the flexible circuit board 24 is connected to the left key set 2 while the other end extends to the bottom of the main key set 3. In addition, the bottom of the main key set 3 has a flexible circuit board 35 connected thereto. The flexible circuit boards 14, 24 and 35 are connected to a main circuit board 8 of the keyboard chassis 6 as shown in FIG. 3. Two grooves 25, 15 are formed on the bottom of the left key set 2 and the right key set 1 and accommodate the flexible circuit boards 24, 14 in the contraction mode, respectively.

Figure 9A:
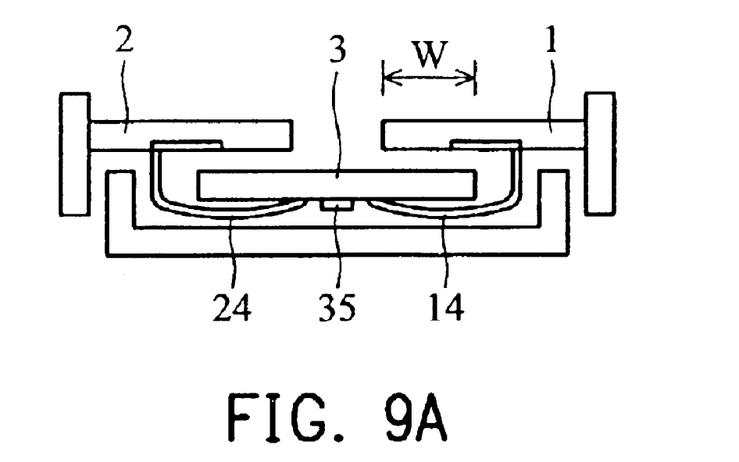
FIG. 9A shows the position of the flexible circuit board of the present collapsible keyboard in contraction mode.
Figure 9B:
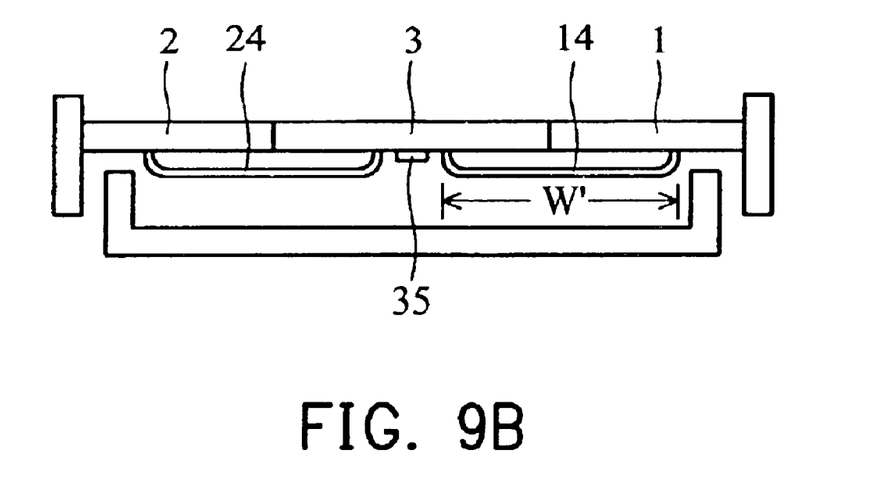
FIG. 9B shows the position of the flexible circuit board of the present collapsible keyboard in expansion mode.

Referring to FIG. 9A and FIG. 9B, when the collapsible keyboard is in the contraction mode, the length W of the overlapped portion between the left key set 2 and the main key set 3 or between the right key set 1 and the main key set 3 is smaller than the length W' of the flexible circuit board 24 or 14. Thus, the flexible circuit boards 24, 14 extend from the bottom of the main key set 3 to the top of the main key set 3 and connect the left key set 2 and the right key set 1, respectively.

Figure 10:
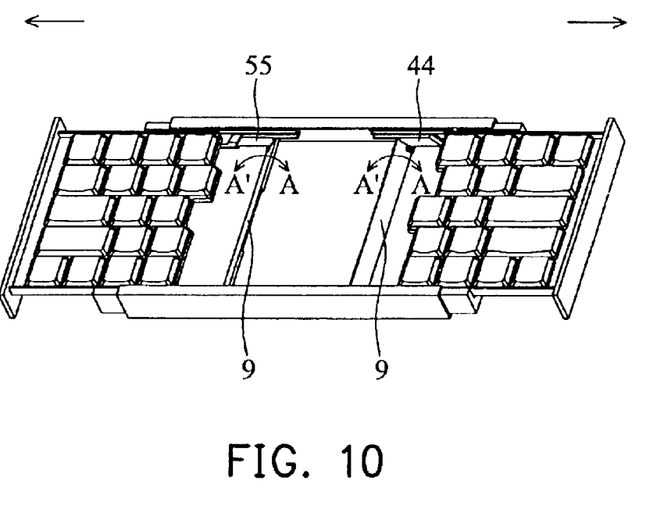
FIG. 10 shows the supporting element of the present collapsible keyboard.

Referring to FIG. 10, two metal supporting elements 9 are disposed on the keyboard chassis 6 and rotate in the direction A–A'. The metal supporting elements 9 can be disposed on the bottom of the keyboard chassis 6 horizontally or disposed on the bottom of the keyboard chassis 6 vertically to support the main key set 3. Two pushing portions 55, 44 are formed on the cantilevers of the left key set 2 and the right key set 1 for pushing down the metal supporting elements 9. Namely, when the collapsible keyboard is in the contraction mode, the metal supporting elements 9 are horizontally disposed. When the collapsible keyboard expands, the main key set 3 rises and the magnets 36 disposed on the bottom of the main key set 3 attract the metal supporting elements 9. Then, the metal supporting elements 9 rotate to a vertical position by attraction of the magnets 36 to support the main key set 3. Thus, when the keys of the main key set 3 are pressed, the main key set 3 does not descend unexpectedly. Meanwhile, the sliding elements 52 are positioned in the concave portions 651 of the block 65, as shown in FIG. 7C. The pushing portions 55, 44 connected to the sliding elements 52 do not touch the metal supporting elements 9. When the collapsible keyboard contracts, the sliding elements 52 return to the first portion 631. The pushing portions 55, 44 connected to the sliding elements 52 push down the metal supporting elements 9. Then, the main key set 3 descends to the initial position.

The aforementioned metal supporting element and magnet may be replaced by a supporting element and a resilient element. Namely, a torsion spring is disposed on a rotary shaft on which the supporting element pivots. One end of the torsion spring engages the supporting element while the other end abuts the keyboard chassis 6. When the main key set 3 rises, the supporting element is disposed on the bottom of the keyboard chassis 6 vertically by resilient force of the torsion spring to support the main key set 3. When the collapsible keyboard contracts, the pushing portions 55, 44 push down the supporting elements 9 and the main key set 3 descends to the initial position.

While the invention has been described by way of examples and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A collapsible keyboard, comprising:
   a keyboard chassis;
   a right track frame slidably disposed on the keyboard chassis and sliding rightward and leftward, the right track frame having a first sloped sliding groove, wherein the left portion of the first sloped sliding groove is higher than the right portion of the first sloped sliding groove;
   a right key set movably connected to the right track frame, the right key set driving the right track frame move rightward to a right expansion position when the right key set moves rightward, the right key set driving the right track frame move leftward to a right contraction position when the right key set moves leftward;
   a main key set having a right protruding element, the right protruding element formed on the right side of the main key set and slidably received in the first sloped sliding groove,
   whereby, when the right track frame is moved to the right expansion position, the right protruding element of the main key set slides to the left portion of the first sloped sliding groove so that the right side of the main key set rises to a first rising position,
   whereby, when the right track frame is moved to the right contraction position, the right protruding element of the main key set slides to the right portion of the first sloped sliding groove so that the right side of the main key set lowers to a first descending position, the first descending position is lower than the first rising position.

2. The collapsible keyboard as claimed in claim 1, further comprising:
(a) a left track frame slidably disposed on the keyboard chassis and sliding rightward and leftward, the left track frame having a second sloped sliding groove, the right portion of the second sloped sliding groove higher than the left portion of the second sloped sliding groove;
(b) a left key set movably connected to the left track frame, the left key set driving the left track frame move leftward to a left expansion position when the left key set moves leftward, the left key set driving the left track frame move rightward to a left contraction position when the left key set moves rightward;
the left side of the main key set further comprising a left protruding element, the left protruding element slidably received in the second sloped sliding groove,
whereby, when the left track frame is moved to the left expansion position, the left protruding element of the main key set slides to the right portion of the second sloped sliding groove so that the left side of the main key set rises to a second rising position,
whereby, when the left track frame is moved to the left contraction position, the left protruding element of the main key set slides to the left portion of the second sloped sliding groove so that the left side of the main key set lowers to a second descending position, the second descending position is lower than the second rising position.

3. The collapsible keyboard as claimed in claim 1, wherein the right track frame further comprises a right horizontal sliding groove and the right key set further comprises a right key protrusion sliding in the right horizontal sliding groove.

4. The collapsible keyboard as claimed in claim 3, wherein the left track frame further comprises a left horizontal sliding groove and the left key set further comprises a left key protrusion sliding in the left horizontal sliding groove.

5. The collapsible keyboard as claimed in claim 1, wherein the keyboard chassis further comprises a recess and a block, the recess having a left end, a first right end and a second right end, the first right end connected to the second right end by a front-rear extended channel, the left end connected to the first right end by a first left-right extended channel, the left end connected to the second right end by a second left-right extended channel, a first sloped surface formed on the sidewall of the first left-right extended channel and guided to the first right end, a second sloped surface formed on the sidewall of the second left-right extended channel and guided to the left end, a third sloped surface formed on the right side of the front-rear extended channel and guided to the second right end, the block disposed on the left side of the front-rear extended channel and facing the first right end, the right track frame having a right sliding element capable to move frontward and rearward, the bottom portion of the right sliding element sliding in the recess,
whereby, when the right track frame is moved rightward from the right contraction position, the bottom portion of the right sliding element slides to the first right end guided by the first sloped surface,
whereby, when the right track frame is further moved reversely, the bottom portion of the right sliding element slides to the block to position the right track frame at the right expansion position,
whereby, when the right track frame is moved rightward from the right expansion position, the bottom portion of the right sliding element slides to the second right end guided by the third sloped surface,
whereby, when the right track frame is further moved reversely, the bottom portion of the right sliding element slides to the left end guided by the second sloped surface to position the right track frame at the right contraction position.

6. The collapsible keyboard as claimed in claim 1, wherein the bottom of the main key set further comprises a magnetic element, the right track frame further comprises a right pushing portion, and the keyboard chassis further comprises a rotary metal element, the rotary metal element pivoting on the keyboard chassis and rotating between a vertical position and a horizontal position, the rotary metal element rotating to the vertical position to support the main key set when the right side of the main key set rises, the right pushing portion of the right track frame pushing down the rotary metal element to make the rotary metal element rotate to the horizontal position when the right track frame is moved to the right contraction position.

7. The collapsible keyboard as claimed in claim 1, wherein the bottom of the right key set further comprises a right flexible circuit board and the keyboard chassis further comprises a keyboard circuit electrically connected to the right flexible circuit board, the right key set moving leftward to overlap the main key set when the right track frame is moved to the right contraction position, wherein the overlapped portion between the right key set and the main key set is shorter than the right flexible circuit board.

8. The collapsible keyboard as claimed in claim 1, wherein the bottom of the right key set further comprises a rack, and the keyboard chassis further comprises a resilient engaging element, a right expansion positioning recess and a right contraction positioning recess formed on one side of the rack, the resilient engaging element abutting the side of the rack, the resilient engaging element engaged in the right expansion positioning recess when the right key set moves to a first predetermined position, the resilient engaging element engaged in the right contraction positioning recess when the right key set moves to a second predetermined position.

9. The collapsible keyboard as claimed in claim 2, wherein the keyboard chassis further comprises a gear, the bottom of the right key set further comprises a right rack, and the bottom of the left key set further comprises a left rack, two rows of teeth formed on one side of the right rack and one side of the left rack, respectively, the two rows of teeth facing each other and engaging the gear, the teeth of the right rack driving the gear when the right key set moves rightward, so that the gear driving the left rack to make the left key set move leftward simultaneously.

10. A collapsible keyboard, comprising:
a keyboard chassis;
a recess formed on the keyboard chassis and having a left end, a first right end and a second right end, the first right end connected to the second right end by a front-rear extended channel, the left end connected to the first right end by a first left-right extended channel, the left end connected to the second right end by a second left-right extended channel, a first sloped surface formed on the right side of the first left-right extended channel and guided to the first right end, a second sloped surface formed on the left side of the second left-right extended channel and guided to the left end, a third sloped surface formed on the right side of the front-rear extended channel and guided to the second right end, a block disposed on the left side of the front-rear extended channel and facing the first right end;

a right key set movably connected to the keyboard chassis, the right key set moving to a right expansion position when the right key set moves rightward, the right key set moving to a right contraction position when the right key set moves leftward; and a right sliding element moving frontward and rearward and connected to the right key set, the bottom portion of the right sliding element sliding in the recess, whereby, when the right key set moves rightward from the right contraction position, the bottom portion of the right sliding element slides to the first right end guided by the first sloped surface, whereby, when the right key set further moves reversely, the bottom portion of the right sliding element slides to the block to position the right key set at the right expansion position, whereby, when the right key set moves rightward from the right expansion position, the bottom portion of the right sliding element slides to the second right end guided by the third sloped surface, whereby, when the right key set further moves reversely, the bottom portion of the right sliding element slides to the left end guided by the second sloped surface to position the right key set at the right contraction position.

11. A collapsible keyboard, comprising:

a keyboard chassis;

a main key set moving upward and downward and connected to the keyboard chassis, the main key set alternatively moving to a rising position and a descending position;

a pushing portion sliding rightward and leftward and connected to the keyboard chassis, the pushing portion alternatively moving to a contraction position and an expansion position; and a supporting element rotatably connected to the keyboard chassis, the supporting element rotating between a vertical position and a horizontal position, whereby, when the pushing portion is positioned at the expansion position and the main key set is at the rising position, the supporting element rotates to the vertical position to support the main key set, whereby, when the pushing portion is positioned at the contraction position, the pushing portion pushes down the supporting element to make the supporting element rotate to the horizontal position and the main key set moves to the descending position.

12. The collapsible keyboard as claimed in claim 11, wherein the keyboard chassis further comprises a magnetic element, the magnetic element attracting the supporting element to rotate the supporting element to the vertical position and support the main key set when the main key set rises.

13. The collapsible keyboard as claimed in claim 11, further comprising a resilient element, one end of the resilient element connected to the keyboard chassis, the other end of the resilient element connected to the supporting element, the supporting element rotating to the vertical position to support the main key set by the resilient element when the main key set rises.

14. A collapsible keyboard, comprising:

a keyboard chassis;

a main key set moving upward and downward and connected to the keyboard chassis, the main key set alternatively moving to a rising position and a descending position;

a right key set sliding rightward and leftward and connected to the keyboard chassis, the right key set alternatively moving to a right contraction position and a right expansion position, the bottom of the right key set having a right flexible circuit board; and a keyboard circuit disposed on the keyboard chassis and electrically connected to the right flexible circuit board, whereby, when the right key set moves to the right expansion position and the main key set moves to the rising position, the right key set and the main key set are at the same height, whereby, when the right key set moves to the right contraction position and the main key set moves to the descending position, the right key set moves leftward to overlap the main key set and the overlapped portion has a length W, whereby, when the right key set overlaps the main key set, the right flexible circuit board is longer than the length W so that a part of the right flexible circuit board is located on the main key set.

15. The collapsible keyboard as claimed in claim 14, wherein the bottom of the right key set has a groove, the right flexible circuit board accommodated in the groove when the right key set is at the right contraction position.

16. A collapsible keyboard, comprising:

a keyboard chassis;

a right key set sliding rightward and leftward and connected to the keyboard chassis, the right key set alternatively moving to a right contraction position and a right expansion position;

an engaging member disposed on the bottom of the right key set and having a side, the side having a right expansion positioning hole and a right contraction positioning hole; and a resilient engaging element disposed on the keyboard chassis and abutting the side of the engaging member, whereby, when the right key set moves to the right expansion position, the resilient engaging element is engaged in the right expansion positioning hole, whereby, when the right key set moves to the right contraction position, the resilient engaging element is engaged in the right contraction positioning hole.

17. A collapsible keyboard, comprising:

a keyboard chassis;

a main key set moving upward and downward and connected to the keyboard chassis, the main key set alternatively moving to a rising position and a descending position;

a right key set sliding rightward and leftward and connected to the right side of the keyboard chassis, the right key set alternatively moving to a right contraction position and a right expansion position, the left side of the right key set having a first key set edge;

a left key set sliding rightward and leftward and connected to the left side of the keyboard chassis, the left key set alternatively moving to a left contraction position and a left expansion position, the right side of the left key set having a second key set edge; and a connector pivotally connected to the front edge of the keyboard chassis and alternatively rotating between a vertical position and a horizontal position;

whereby, when the main key set, the right key set and the left key set are positioned at the rising position, the right expansion position and the left expansion position, respectively, the right side of the main key set engages the first key set edge and the left side of the main key set engages the second key set edge to form a planar keyboard, whereby, when the main key set, the right key set and the left key set are positioned at the descending position, the right contraction position and the left contraction position, respectively, an accommodation space is formed between the first key set edge and the second key set edge to accommodate the connector positioned at the horizontal position.

18. A collapsible keyboard, comprising:

a track frame having a sliding groove, the sliding groove having at least a first position and a second position, the first position higher than the second position;

a first key set connected to the track frame;

a second key set; and a connection element movably disposed in the sliding groove and connected to the second key set.

19. The collapsible keyboard as claimed in claim 18, wherein the sliding groove is sloped.

20. The collapsible keyboard as claimed in claim 18, further comprising a keyboard chassis accommodating and supporting the track frame, the first key set, the second key set, and the connection element.

21. The collapsible keyboard as claimed in claim 20, further comprising a sliding element connected to the track frame and the keyboard chassis, the keyboard chassis having a recess accommodating the sliding element, the sliding element moving in the recess.

22. The collapsible keyboard as claimed in claim 21, wherein the recess further comprises a first channel, a second channel and a third channel, the first, second and third channels connected to one another, with offsets among the first, second and third channels.

23. The collapsible keyboard as claimed in claim 22, further comprising a block disposed in the recess, the block having a concave portion connected to the second and third channels, with offsets between the concave portion and the second channel and between the concave portion and the third channel.

24. The collapsible keyboard as claimed in claim 21, wherein the sliding element further comprises a polygonal column disposed in the recess.

25. The collapsible keyboard as claimed in claim 24, wherein the polygonal column is a triangular column.

26. The collapsible keyboard as claimed in claim 18, wherein the track frame is substantially C-shaped and includes a main body, a first cantilever and a second cantilever extending from the main body, the sliding groove disposed on the first cantilever, the second cantilever having another sliding groove.

27. The collapsible keyboard as claimed in claim 18, wherein the first key set is movably connected to the track frame.

28. The collapsible keyboard as claimed in claim 18, further comprising a main circuit board disposed under the second key set, a flexible circuit board connected to the main circuit board and the first key set, wherein, when the connection element is moved to the second position, the flexible circuit board extends from the first key set and via the edge of the second key set to the underside of the second key set.

29. The collapsible keyboard as claimed in claim 18, wherein the first key set further comprises a plurality of first keys and the second key set further comprises at least one second key and a plurality of third keys, whereby, when the connection element is moved to the second position, the plurality of first keys overlap and cover the plurality of third keys, and an accommodating space is formed on the second key.

* * * * *